United States Patent

Bove et al.

[11] 3,911,361
[45] Oct. 7, 1975

[54] COAXIAL ARRAY SPACE TRANSFORMER

[75] Inventors: Ronald Bove, Wappingers Falls; Alexander Kostenko, Jr., Hopewell Junction; William J. Tkazyik, Jr., Hyde Park, all of N.Y.

[73] Assignee: International Business Machines Corporation, Armonk, N.Y.

[22] Filed: June 28, 1974

[21] Appl. No.: 484,052

[52] U.S. Cl. .......................... 324/158 P; 324/72.5
[51] Int. Cl.² ..................... G01R 31/02; G01R 1/06
[58] Field of Search ............ 324/158 F, 158 P, 72.5

[56] References Cited
UNITED STATES PATENTS

| | | | |
|---|---|---|---|
| 3,493,858 | 2/1970 | Baron et al. | 324/72.5 |
| 3,731,191 | 5/1973 | Bullard et al. | 324/158 F |
| 3,806,801 | 4/1974 | Bove | 324/72.5 |

*Primary Examiner*—Alfred E. Smith
*Assistant Examiner*—Ernest F. Karlsen
*Attorney, Agent, or Firm*—Wesley DeBruin

[57] ABSTRACT

The invention relates to apparatus for the testing of high circuit density devices fabricated by large scale integration techniques. More specifically, the invention is directed to a coaxial array space transformer for use in electrically coupling a high speed electronic test system to a small precision made probe structure for making electrical contact with a device under test.

The coaxial array space transformer transforms electrical connections from a spacious array to a highly dense array. In this physical transformation, the electrical characteristics of the conducting paths are controlled to provide an electrical environment where high speed, integrated electrical components can be successfully tested.

The coaxial array space transformer disclosed and claimed herein has particular utility when employed in combination with a probe structure such as a PROBE CONTACTOR HAVING BUCKLING BEAM PROBES, as disclosed and claimed in U.S. Pat. No. 3,806,801, granted Apr. 23, 1974 to Ronald Bove, and of common assignee herewith.

3 Claims, 8 Drawing Figures

COAXIAL ARRAY SPACE TRANSFORMER

BACKGROUND OF THE INVENTION AND PRIOR ART

In obtaining the electrical characteristics of components, integrated circuits for example, it is imperative that connecting paths from the tester to the circuit, or device under test, have a controlled electrical environment so as not to distort the test signals and the test results. This is especially important in light of the ever increasing circuit speeds of the components under test. Therefore, in order to obtain valid useful information, the electrical path from the tester to the device under test and back to the tester must be carefully controlled with a constant impedance, and a minimum disruption of this constant impedance environment.

Also increasing, in addition to circuit speeds of electrical devices, are the devices input-output pad densities and multiplicities. These factors oppose from a practical or a fabrication point of view, the ability to achieve a minimum acceptable distortion environment.

A major portion of the electrical path from the tester to the device under test and return is used for the space transformation function. Its purpose is to take a large multiplicity of electrical conductors from the tester which are spaciously arrayed and transform them into a highly dense array similar to, or identical to, the device input-output pad density pattern. Since the conducting path length from the tester to the device under test is dominated by the space transformer, for electrical testing to be done successfully, a constant impedance environment is necessitated.

The present invention fulfills the foregoing needs by providing a coaxial array space transformer structure employing coaxial cables, printed circuit boards and additional structural elements, and constructing them into a novel and unobvious structure so as to obtain a constant impedance environment with minimum discontinuity and minimum cross talk.

Reference is made to the U.S. Pat. No. 3,731,191, granted May 1, 1973 for a "Micro-Miniature Probe Assembly" to Robert L. Bullard et al. and of common assignee herewith.

U.S. Pat. No. 3,731,191 is directed to a multi-probe test circuit assembly particularly adapted for producing low resistance electrical connections to a semiconductor component of which the electrical parameters are to be evaluated.

In accordance with the invention disclosed and claimed in U.S. Pat. No. 3,731,191, a contact apparatus is provided in which a plurality of probe elements are fixedly held by a common support housing in a fixed array corresponding with the terminal contact pattern of the circuit device to be engaged for testing. Essentially, the probe elements comprise individual tubular probe guides with individual probe wires or the like removably contained and compressible within the probe guides. Fixation of the probe elements in the desired array is provided by an encapsulation housing including a support plate portion of the support housing having a plurality of openings arranged to correspond with the test contact pattern of the circuit device. One end of each of the tubular probe guides is attached to the support plate within the plate openings while the other end is held within the housing preferably adjacent and in abutment with a pressure plate opposite the remote ends of the probe guides. The probe wires are designed such that when fully inserted within the probe guide, they extend a controlled amount beyond the end of the housing support plate while the remote ends of the probe wires abut the pressure plate. The tubular probe guides are high conductivity material while the probe wires are conductive material having high resistance to abrasne wearing. Electrical circuit continuity is made by surface contact of the probe wires within the probe guides which are in turn connected to external connector boards or the like mounted on the housing and having provision for connection to external test circuits or the like.

In U.S. Pat. No. 3,731,191, the probe guides are preferably curved between their ends within the housing. Thus, when contact is made with a test terminal, the probe wires have a spring-like quality and are compressible within the probe guides, the curvature and spring-like qualities of the probe wires causing electrical contact to occur very close to the contact end of the probe guide. Thus, only a short length of the relatively high resistance probe wire is in the electrical circuit while the high conductivity probe guide acts as the principal electrical connection with the external circuits. Since the probe guides and probe wires are conductive, the contact apparatus is essentially made of dielectric materials, particularly the support plate and the pressure plates. In addition, the probe guides are completely encapsulated within a dielectric material so that the probe elements are mutually electrically insulated as well as being held rigidly in position.

U.S. Pat. No. 3,806,801, fully identified earlier herein, is directed to a probe contactor which has each of its probes formed with a length many times its cross sectional area so that the probes buckle or deflect when a predetermined axial load is applied thereto. This enables the same force to be exerted on each of a plurality of pads on a semiconductor chip regardless of the deflection of the probes produced by variations in the heights of the pads.

U.S. Pat. No. 3,806,801 provides a probe contactor in which each of the probes will exert a substantially constant force on each of the pads on the chip irrespective of the relative heights of the pads on the chip as long as the pads on the chip have their heights within the predetermined range in which the probes can engage the pads. This is accomplished by forming each of the probes with a length many times its cross sectional area so that each of the probes may be deemed to be a beam. Each of the probes is designed so that it will deflect over a range when a predetermined force is applied at its end engaging the pad to axially load the probe so as to prevent any additional force, beyond the predetermined force, being applied to the pad due to engagement of the pad with the probe.

A primary object of the invention is to provide an improved space transformer for use with a probe structure in a test system for testing high circuit density devices fabricated by large scale integration techniques.

A primary object of the invention is to provide a coaxial array space transformer for use in a test system for testing integrated circuit devices and wherein a substantially constant electrical parameter environment is maintained between the test system and the device under test.

A further object of this invention is to provide an improved space transformer for use in a test system for providing a constant impedance environment between a first small pattern of closely spaced electrical contacts and a second larger pattern of less closely spaced electrical contacts.

A further object of this invention is to provide an electrical connector for use in respectively connecting n electrical contacts arranged in a very small area on a first plane in space to n electrical contacts arranged in a small area on a second plane in space, where said first and second planes are displaced in space a small distance, and each of said n connections between said n electrical contacts in said first plane and said n electrical contacts in said second plane have uniform and equal electrical parameters such as impedance.

A further object of this invention is to provide a space transformer structure for electrically connecting each of a first group of n electrical contacts to a predetermined one of a second group of n electrical contacts where said first group of electrical contacts are respectively very closely spaced in distance one from another and said second group of electrical contacts are respectively less closely spaced in distance one from another, and each of said n electrical connections has substantially equal and uniform impedance characteristics whereby cross talk between said n electrical connections is minimized.

A further object of this invention is to provide a space transformer structure for use in a test system for testing very small electronic devices fabricated by large scale integration techniques, said space transformer comprising a first densely spaced array of electrical contacts lying within a first planar surface in space, a second relatively spaciously spaced array of electrical contacts lying within a second planar surface in space, where said first and said second planar surfaces in space are parallel one to another and displaced a small distance, a plurality of electrical conductors disposed between said first array of electrical contacts and said second array of electrical contacts, each of said plurality of electrical conductors electrically interconnecting a discrete one of said first densely spaced array of electrical contacts with a discrete one of said second relatively spaciously spaced array of electrical contacts, structural means supporting said plurality of electrical conductors, in a spaced relationship one to another, whereby each of said electrical paths from said first array of contacts to said second array of contacts provided by said plurality of conductors has uniform electrical characteristics.

A still further object of this invention is to provide an improved space transformer for use in combination with a flexible beam probe structure of the type disclosed in U.S. Pat. No. 3,806,801.

A still further object of this invention is to provide a coaxial space transformer where discontinuities in the electrical paths from the device under test to the test system are minimized.

A still further object of this invention is to provide a coaxial space transformer where cross talk between the electrical paths from the device under test to the test system are minimized.

A still further object of this invention is to provide an improved space transforming and probe structure for interconnecting a test system with a device under test.

The foregoing and other objects, features and advantages of the invention will be more apparent from the following more particular description of the preferred embodiments of the invention, as illustrated in the accompanying drawings.

In the drawings:

FIG. 1 is an orthoganal assembly view of a coaxial array space transformer of the present invention employed with a probe contactor of the type disclosed in U.S. Pat. No. 3,806,801. The view is partially sectioned to show elements and electrically conductive paths.

PREFERRED EMBODIMENT

Figure 1:
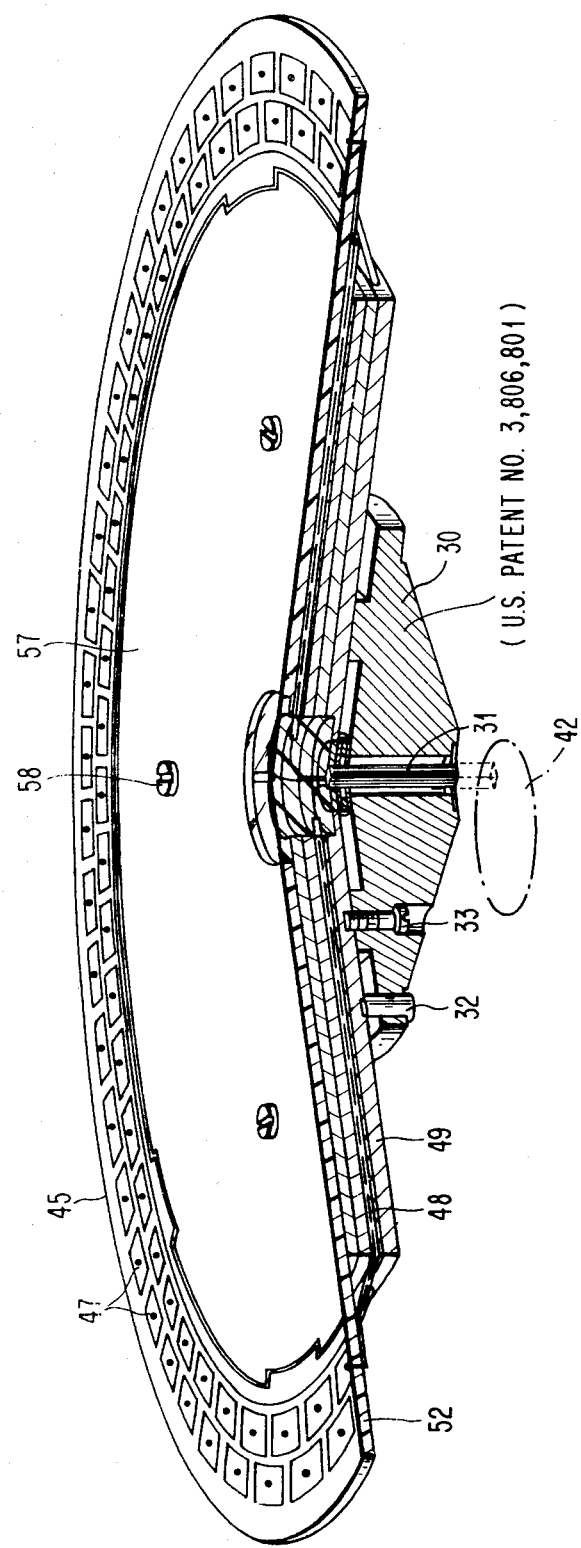
Figure 4:
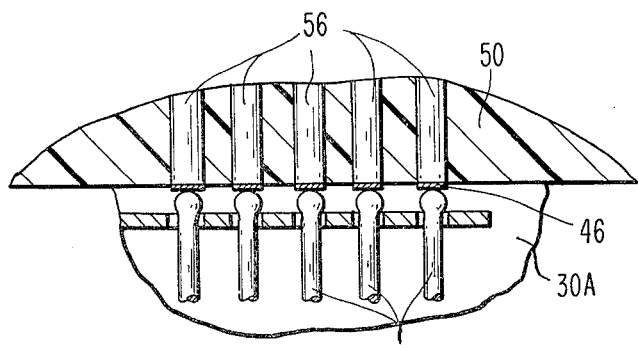
FIG. 4 shows an expanded sectional view of the electrical interface between the coaxial space transformer and the probe contactor.

Referring to the drawings and in particular to FIG. 1, there is shown a flexible beam probe contactor employed with the coaxial array space transformer of the present invention. The probe contactor is used to provide direct electrical contact to the device under test 42. In FIG. 1, the device under test 42 is depicted as wafer of semiconductor material. As is readily apparent to persons skilled in the art, the semiconductor wafer may comprise a plurality of semiconductor chips each having a high circuit density device fabricated thereon by large scale integration techniques. The interconnection between the coaxial array space transformer 45 and the probe 30 is made by the contact of the probe beams or pins 31 and the pads 46, as shown in FIG. 4. Alignment of the probe pins 31 and pads 46 is achieved using diametrically disposed dowel pins 32 on probe 30 which are mated to machined openings in the space transformer 45. Fastening of probe 30 to coaxial arrayed space transformer 45 is obtained by means of diametrically disposed screws 33 which are secured into the space transformer. At the mating of the probe contactor 30 and the coaxial array space transformer 45, a large multiplicity of densely arranged connections are made on an easily separable interface. It will be appreciated that this interface facilitates the replacement of the probe contactor. Also this interface permits the use of probe contactors having a number of probes equal to or less than the contacts or pads 46 provided by the space transformer. Further, this interface permits the use of any suitable probe contactor having appropriate contacts and being designed to mate with the space transformer.

The coaxial arrayed space transformer provides electrically conductive paths that are transformed from the dense array of the probe to the spacious array of the tester. These electrical paths have uniform and predetermined electrical characteristics. Contact between the space transformer and the tester is made at pads 47 as shown on FIG. 1. Contact is made to these pads 47 by any suitable means such as commerically available spring or plunger type contactors or cantilever beam contactors. At this interface as with the other, a separable contacting interface is achieved of a large multiplicity of points, however, now it's on a relatively spacious array.

As is apparent, this interface facilitates the detachment of the space transformer 45 and/or probe contactor from the test system.

Figure 2:
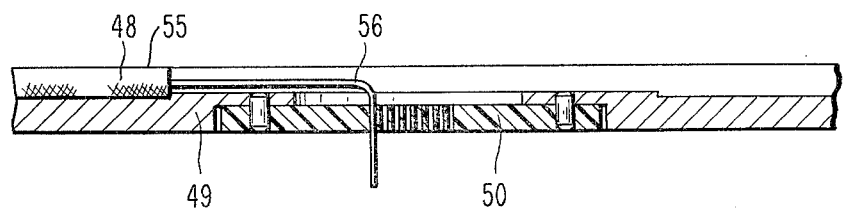
FIG. 2 is a fragmentary sectional view of a coaxial array space transformer in the process of assembly.
Figure 3:
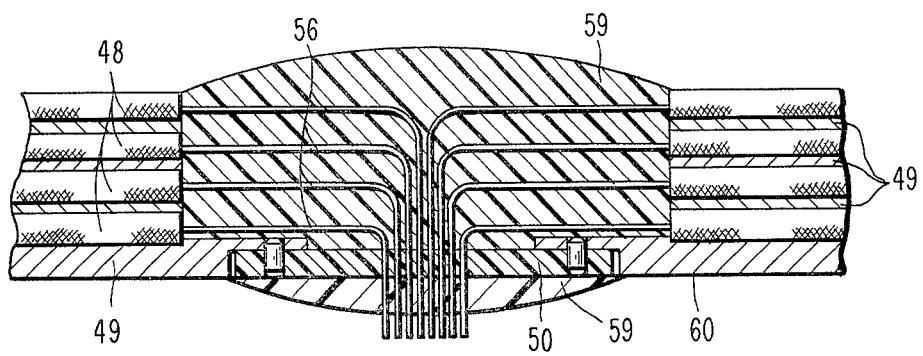
FIG. 3 is a fragmentary sectional view of the center section of the coaxial space transformer, which has all conductors in place and is cast with a potting compound.

Reference is made to FIGS. 2 and 3. The coaxial array space transformer employs a plurality of coaxial cables 48 which are structurally supported by electrically conductive preferably metallic plates 49. For each level, the plates 49 have grooves or channels to retain the cables 48. The plates 49 may be brass with appropriate radially spaced channels machined therein. At the center of the coaxial array space transformer, the coaxial cables 48 converge. A portion of the coaxial cable has been prestripped, that is, the outer shield and the dielectric has been removed allowing only the conductive center or conductor 56 (FIG. 2) of the cable to extend. Central to the coaxial array space transformer, as shown in FIG. 2, the conductors 56 are placed through die 50. This die 50 holds the conductors 56 from all the coaxial cables 48 so that the geometrical relationship of these wires when assembled, are on the desired dense pattern. This pattern is identical to that of the probe pins 31 (FIG. 4) of probe contactor 30 (FIG. 1), thereby allowing electrical connection to be made between the two. The die 50 is formed of a suitable electrically insulating material so that there is no electrically conductive path between the conductors 56 of the coaxial cables.

At the outer diameter of the space transformer, the coaxial cables 48, which have been appropriately prestripped prior to assembly, respectively, have their center conductors 56 attached by soldering to an electrically conductive strip or land 51 (FIG. 5A) on the bottom surface of the organic printed circuit board 52. Each land is so designed as to have the same impedance characteristics as the coaxial cable, providing a continuous constant impedance path. The lands 51 are respectively electrically connected to pads 47 on the top surface of the printed circuit board 52 by means of of plated through via holes 54.

The ground path from the coaxial shields 55 which are all commoned by the contact with the conductive plates 49 is electrically connected to the top surface of the printed circuit board 53 to a ground plane ring 57 by means of via holes 61 (FIG. 5A) and/or electrically conductive screws 58 (FIG. 1).

The assembly of this structure is initiated with the mounting of the die 50 into the first supporting plate 49. As shown in FIG. 2, the coaxial cable 48 which has both ends stripped has its center conductor 56 placed in its proper position in the array of apertures of the die 50. The unstripped portion of coaxial cable 48 is attached to the plate 49 by means of electrically conductive epoxy which insures that a good electrical contact is made between the plate 49 and the outer shield 55 of the coaxial cable 48. When all positions of the first level (plate 49) have been populated with coaxial cables, the next plate 49 is positioned over the first level plate. The plates 49 are joined once again by electrically conductive epoxy and/or electrically conductive screws. Dowel pins in the assembly provide the orienting features for all layers. Coaxial cables are now assembled into the die 50 and grooves of the second plate 49 as previously described. When all layers are complete, the center section of this assembly, see FIG. 3, is potted with a casting compound which has good dielectric characteristics such as Emerson and Cummings STYCAST No. 1266.

Figure 5:
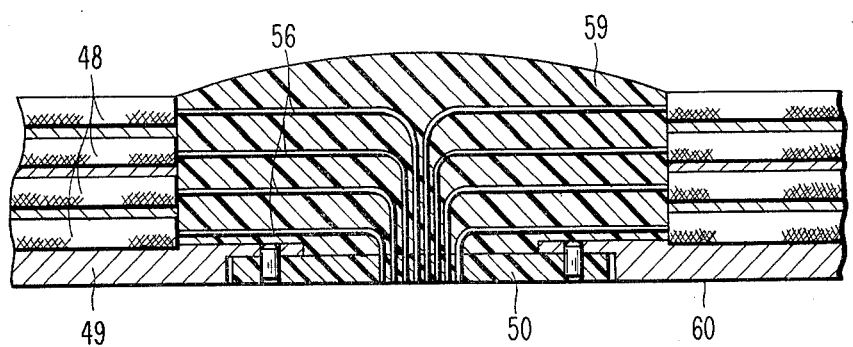
FIG. 5 is a fragmentary sectional view of the coaxial space transformer showing a center section which has the lower surface machine ground.

After curing the bottom surface 60 (FIG. 3) is machined providing a flat surface where the conductors 56 of each of the coaxial cables 48 are in the desired grid pattern, or array (see FIG. 5). The contact areas for interconnection between the probe contactor 30 and the space transformer 45 are respectively the diameter of the center conductor 56 of the coaxial cables 48. The ends of the center conductors or wires 56 are suitably plated 46 (FIG. 4) for achieving the desired good wear and low contact electrical resistance surface.

Figure 5A:
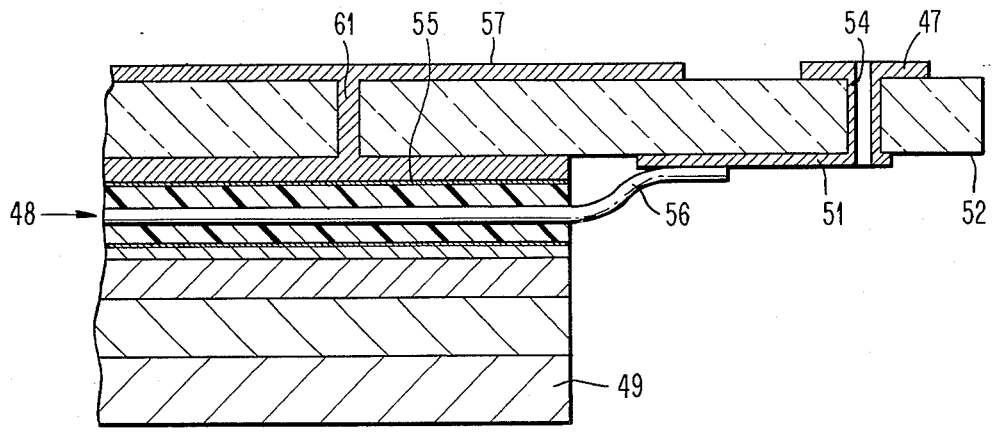
FIG. 5A is a fragmentary sectional view showing the interconnection of the center of one coaxial cable, the conducting wire, soldered to the circuit board. board.

The multilayered coaxial assembly is next attached to the printed circuit board 52. After mechanical fastening by means of screws 58, FIG. 1, the free end of each of the coaxial cables is attached by soldering the center conductor thereof 56 to a line or pad 51 of the printed circuit board, (see FIG. 5A). The line 51 continues to a plated through via hole 54 which provides an electrical path from the bottom surface of the printed circuit board to the top pads 47. The pads 47 on the top surface, are arranged in a spacious array for easy access. As can be seen in FIG. 5A, a ground ring 57 is shown which is electrically connected to all the coaxial cable shields. This ring 57 provides the means to externally connect the required ground connection.

Figure 6:
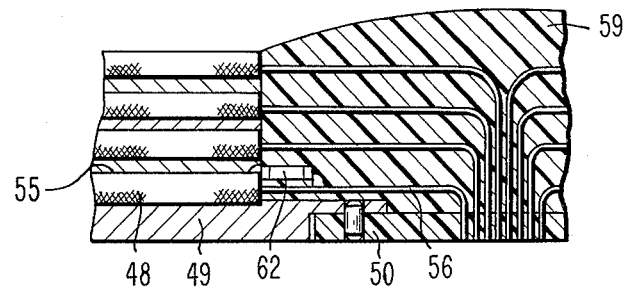
FIG. 6 is a fragmentary sectional view of the center portion of the space transformer illustrating the addition of a component — a capacitor — to one conductor.
Figure 6A:
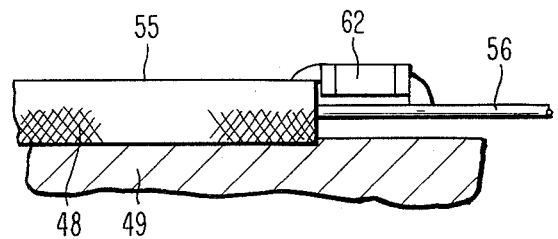
FIG. 6A shows an exploded view of the attachment of the component of FIG. 6 to the conductor.

FIGS. 6 and 6A disclose how a typical coaxial cable has an electrical component attached to the conductive path. In this example, a capacitor 62 is added to the coaxial cable. One end of the capacitor is attached to the center conductor 56 the other to the coaxial shield 55 electrically achieving capacitance to ground.

While the invention has been described and shown particularly with reference to one of its preferred embodiments, it will be understood by those skilled in the art to which the work is directed that various changes in form and detail may be made without departing from either the spirit or scope of the invention.

What is claimed is:

1. In an electronic test system including a tester for electrically testing devices fabricated by large scale integration techniques, an electrical structure for connecting said tester to an electronic device under test, said structure consisting essentially of an electrical array space transformer and a probe contactor having a plurality of buckling beam probes, and wherein said electrical array space transformer comprises:

a first spaciously spaced array of electrical contacts lying within a first planar surface in space;

a second densely spaced array of electrical contacts lying within a second planar surface in space, wherein said first and second planar surfaces are displaced parallel one from the other;

a plurality of coaxial electrical conductor, disposed between said first spaciously spaced array of electrical contacts and said second densely spaced array of electrical contacts, each of said plurality of electrical conductors electrically interconnecting a discrete one of said first spaciously spaced array of electrical contacts with a discrete one of said second densely spaced electrical contacts;

structural means supporting said first spaciously spaced electrical contacts, said second densely spaced electrical contacts and said plurality of conductors;

said structural means consisting essentially of:

a plurality of portions of material, certain of said portions of material having high electrical conductivity and other portions of said material being essentially non-electrically conductive and having predetermined dielectric properties, whereby each of said plurality of electrical conductors provides an electrical path from a discrete one of said first spaciously spaced electrical contacts to a discrete one of said second densely spaced electrical contacts and each of said plurality of electrical conductors has substantially uniform electrical impedance characteristics, and cross-talk between said electrical conductors is minimized.

2. In an electronic test system employing an electronic tester and circuit means for connecting said tester to a high circuit density monolithic device under test and where said circuit means includes a unitary structural combination of a space transformer and a probe structure, said space transformer and said probe structure being mechanically and electrically mated to provide a plurality of discrete physical electrical contacts with said device under test, said space transformer including:

a printed circuit board having a plurality of discrete electrically conductive contact areas and at least one relatively large contact area, a densely spaced array of discrete electrical contacts;

said densely spaced array of discrete electrical contacts being supported by and maintained in spaced relationship one to another by a material having predetermined dielectric characteristics;

a plurality of coaxial cables;

each of said coaxial cables having an inner conductor, an outer ground shield and dielectric material maintaining said inner conductor and said outer ground shield in spaced relationship;

each of said inner conductors of said plurality of coaxial cables being connected between a predetermined one of said plurality of discrete electrically conductive contact areas on said printed circuit board and a predetermined one of said densely spaced array of electrical contacts;

a plurality of metallic plates for supporting said plurality of coaxial cables in spaced relationship;

connection means for electrically connecting in common each of said plurality of metallic plates, each of said outer ground shields of said plurality of coaxial cables, and said relatively large contact area on said printed circuit board;

said probe structure having a plurality of electrically discrete buckling beam probes;

each of said buckling beam probes making physical and electrical contact with a predetermined one of said densely spaced array of discrete electrical contacts;

each of said buckling beam probes having a length many times its cross-sectional area whereby the probes buckle when an axial load is applied thereto.

3. In an electronic test system including a tester for electrically testing devices fabricated by large scale integration techniques, an electrical structure for connecting said tester to an electrical device under test, as recited in claim 1, wherein each of said plurality of buckling beam probes of said probe contactor is in electrical contact with a discrete one of said second densely spaced array of electrical contacts, and each of said probes of said plurality of buckling beam probes has a length many times its largest cross sectional dimension whereby each of said plurality of probes independently buckles when a predetermined force is axially applied thereto.

* * * * *

UNITED STATES PATENT OFFICE
CERTIFICATE OF CORRECTION

PATENT NO. : 3,911,361
DATED : October 7, 1975
INVENTOR(S) : Ronald Bove et al

It is certified that error appears in the above-identified patent and that said Letters Patent are hereby corrected as shown below:

Column 2, line 7      "abrasne" should read - abrasive -.

Column 4, line 23      "to the circuit board.board." should read - to the printed circuit board. -.

Column 5, lines 47, 48      "of of plated" should read - of plated -.

Signed and Sealed this twenty-seventh Day of April 1976

[SEAL]

Attest:

RUTH C. MASON
*Attesting Officer*

C. MARSHALL DANN
*Commissioner of Patents and Trademarks*